(12) United States Patent
Yeom

(10) Patent No.: US 7,505,093 B2
(45) Date of Patent: Mar. 17, 2009

(54) LIQUID CRYSTAL DISPLAY MODULE

(75) Inventor: Moon-Soo Yeom, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 254 days.

(21) Appl. No.: 10/958,582

(22) Filed: Oct. 6, 2004

(65) Prior Publication Data

US 2005/0073626 A1    Apr. 7, 2005

(30) Foreign Application Priority Data

Oct. 7, 2003    (KR) ...................... 10-2003-0069462

(51) Int. Cl.
*G02F 1/1335* (2006.01)

(52) U.S. Cl. .............................. 349/64; 349/58; 349/61; 349/62; 349/63; 349/65; 349/66; 349/67; 349/68; 349/69; 349/70; 349/71

(58) Field of Classification Search .................... 349/58, 349/61–71
See application file for complete search history.

(56) References Cited

U.S. PATENT DOCUMENTS

| | | | |
|---|---|---|---|
| 6,490,015 B1 * | 12/2002 | Kim ............................ | 349/58 |
| 6,490,016 B1 * | 12/2002 | Koura ......................... | 349/58 |
| 6,600,526 B2 * | 7/2003 | Yano ........................... | 349/65 |
| 7,113,235 B2 * | 9/2006 | Tsukamoto .................. | 349/58 |
| 2003/0020849 A1 * | 1/2003 | Jang et al. ..................... | 349/65 |
| 2005/0018104 A1 * | 1/2005 | Lee et al. ....................... | 349/65 |
| 2005/0030443 A1 * | 2/2005 | Nagahama ................... | 349/64 |

FOREIGN PATENT DOCUMENTS

KR    2003-0005882    1/2003

* cited by examiner

*Primary Examiner*—David Nelms
*Assistant Examiner*—Thanh-Nhan P Nguyen
(74) *Attorney, Agent, or Firm*—Morgan Lewis & Bockius LLP

(57) ABSTRACT

A liquid crystal display module includes a backlight assembly having a lamp, a lamp housing surrounding the lamp and having an open portion along a first side, a light guide plate disposed adjacent to the open portion of the lamp housing, and a plurality of optical sheets disposed on the light guide plate, edge portions of the plurality of optical sheets are disposed spaced apart from the light guide plate by interposing a top portion of the lamp housing between a periphery of the light guide plate and the edge portions of the plurality of optical sheet, a liquid crystal panel disposed over the plurality of optical sheets, a main support disposed over the lamp housing and accommodating the liquid crystal panel, a top case surrounding edge portions of the liquid crystal panel, and a bottom case supporting and accommodating the backlight assembly.

1 Claim, 2 Drawing Sheets

LIQUID CRYSTAL DISPLAY MODULE

The present invention claims the benefit of Korean Patent Application No. 2003-0069462, filed in Korea on Oct. 7, 2003, which is hereby incorporated by reference.

BACKGROUND OF THE INVENTION

1. Field of the Invention

The present invention relates to a liquid crystal display (LCD) device, and more particularly, to an LCD device including a module assembly.

2. Discussion of the Related Art

In general, flat panel display devices are thin, light weight, and have low power consumption, thus their application in portable devices is increasing. Among the various types of flat panel display devices, liquid crystal display (LCD) devices are widely used for laptop computers and desktop monitors because of their superiority in resolution, color image display, and display quality.

LCD devices make use of a optical anisotropy and polarization properties of liquid crystal molecules to generate a desired image. In particular, liquid crystal molecules can be aligned in a specific orientation by controlling the application of an electric field across the liquid crystal molecules. Due to the optical anisotropy, incident light is refracted according to the orientation of the liquid crystal molecules, thereby generating the desired image.

Specifically, an LCD device includes upper and lower substrates with electrodes formed thereon, wherein the substrates are disposed to be spaced apart and facing each other with a liquid crystal material interposed therebetween. When a voltage is applied to the electrodes to generate an electric field across the liquid crystal material, an alignment direction of the liquid crystal molecules changes in accordance with the applied voltage. As a result, light transmittance through the liquid crystal material varies and images are formed.

Most LCDs are passive devices, in which images are displayed on the liquid crystal panel by controlling the amount of light input from an outside light source. Thus, a separate light source (i.e., backlight device) is generally employed to irradiate an LCD device.

FIG. 1 is a schematic cross-sectional view of a liquid crystal display module according to the related art. In FIG. 1, a liquid crystal display module (LCM) includes a liquid crystal panel 2, a main support 14, a top case 10, a bottom case 50, and a backlight unit. The liquid crystal panel 2 comprises a lower substrate, an upper substrate and a liquid crystal layer interposed between. The main support 14 supports the liquid crystal panel 2, and the top case 10 surrounds the edges of the liquid crystal panel 2 and the main support 14 therein. The backlight unit is consisting of a plurality of optical sheets 32, 34, and 36, and a light guide plate 24. Furthermore, a lamp 20 and a lamp housing 16 are equipped within the backlight unit. The bottom case 50 supports and accommodates the backlight unit with coupling to the top case 10.

On outer surfaces of the liquid crystal panel 2, an upper polarizer 42 is provided to attach onto top of the liquid crystal panel 2, and a lower polarizer 40 is provided to attach onto the bottom of the liquid crystal panel 2. Although not shown, a plurality of pixels are disposed in the liquid crystal panel 2 having a matrix configuration, wherein each pixel includes a thin film transistor (TFT) to drive the liquid crystal molecules.

In FIG. 1, the top case 10 has an L-shaped cross section, and covers the side and the top portions of the main support 14 and the edge portion of the liquid crystal panel 2. Although not shown, the top case 10 may be coupled with the main support 14 by a plurality of screws. The main support 14 is generally formed by a molding die process. When the main support 14 is formed of a metal, for example aluminum (Al), the main support 14 exhibits superior thermal conductivity for a high resolution television and/or computer monitor. The main support 14 includes a protrusion 14a that extends from a body of the main support 14 and supports the liquid crystal panel 2.

The backlight unit is disposed underneath the protrusion 14a and the main support 14. The backlight unit includes a lamp 20 emitting light, a lamp housing 16 accommodating the lamp 20, a light guide plate 24 guiding the incident light toward the liquid crystal panel 2, a reflector 26 disposed underneath the light guide plate 24 and reflecting the light toward the liquid crystal panel 2, a light diffusing sheet 32 disposed on the light guide plate 24, a first prism sheet 34 disposed on the light diffusing sheet 32, and a second prism sheet 36 disposing on the first prism sheet 34. The lamp 20 is a cold cathode fluorescent lamp (CCFL), and the lamp housing 16 accommodates and surrounds the lamp 20 to protect and hold it in place. Furthermore, the lamp housing 16 has an opening along one side and reflects the light to lead the light toward the light guide plate 24.

The light guide plate 24 has a front surface facing the diffusing sheet 32 and a back surface facing the reflector 26. The front surface is a horizontal plane to output the light, and the back surface is formed of an incline surface so that the light from the lamp 20 is converted into surface light by the light guide plate 24. The reflector 26 is arranged underneath the light guide plate 24 and upwardly reflects the light to reduce light loss and increase light efficiency. When the light from the lamp 20 is incident to the light guide plate 24, the back surface having the incline plane uniformly reflects the incident light toward the front surface of the light guide plate 24. In addition, some portions of the light from lamp 20 are upwardly reflected by the reflector 26 toward the light guide plate 24. The light diffusing sheet 32 diffuses the light received from the light guide plate 24 in order to improve the brightness and to increase the range of vision.

Meanwhile, the light perpendicularly enters the liquid crystal panel 2 in order to increase light efficiency. Therefore, two prism sheets 34 and 36 are used to direct the light to be perpendicular to the liquid crystal panel 2. Specifically, the light emitted from the lamp 20 is perpendicularly incident to the liquid crystal panel 2 by way of passing through the light guide plate 24 and the prism sheets 34 and 36.

However, the above-mentioned liquid crystal module (LCM) has some problems. When the LCM having the aforementioned structure is operated for an extended period of time, the lamp 20 may emit significant amounts of heat. Therefore, the emitted heat may cause creation of wrinkles in the light diffusing sheet 32 and the prism sheets 34 and 36. Furthermore, the wrinkles can cause the deterioration of the displayed-image, such as wrinkled images. Especially, since the main frame 14 has the protrusion 14a that can restrict lateral movement as well as vertical movement provided for the optical sheets 32, 34, and 36, the wrinkle phenomenon becomes worse in the optical sheets 32, 34, and 36.

SUMMARY OF THE INVENTION

Accordingly, the present invention is directed to a liquid crystal display module that substantially obviates one or more of the problems due to limitations and disadvantages of the related art.

An object of the present invention is to provide a liquid crystal display module having a structure capable of preventing wrinkles in the optical sheets.

Another object of the present invention is to provide a liquid crystal display module that improves displayed images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes a backlight assembly that includes a lamp, a lamp housing surrounding the lamp and having an open portion along a first side, a light guide plate disposed adjacent to the open portion of the lamp housing; and a plurality of optical sheets disposed on the light guide plate, edge portions of the plurality of optical sheets are disposed spaced apart from the light guide plate by interposing a top portion of the lamp housing between a periphery of the light guide plate and the edge portions of the plurality of optical sheets, a liquid crystal panel disposed over the plurality of optical sheets, a main support disposed over the lamp housing and accommodating the liquid crystal panel, a top case surrounding edge portions of the liquid crystal panel, and a bottom case supporting and accommodating the backlight assembly.

In another aspect, a backlight unit for a liquid crystal module having a liquid crystal panel that includes a lamp, a lamp housing surrounding the lamp and having an open portion along a first side, a light guide plate disposed adjacent to the open portion of the lamp housing; a reflector disposed beneath the light guide plate, and a plurality of optical sheets disposed on the light guide plate, wherein edge portions of the plurality of optical sheets are disposed spaced apart from the light guide plate by interposing a top portion of the lamp housing between a periphery of the light guide plate and the edge portions of the plurality of optical sheets.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
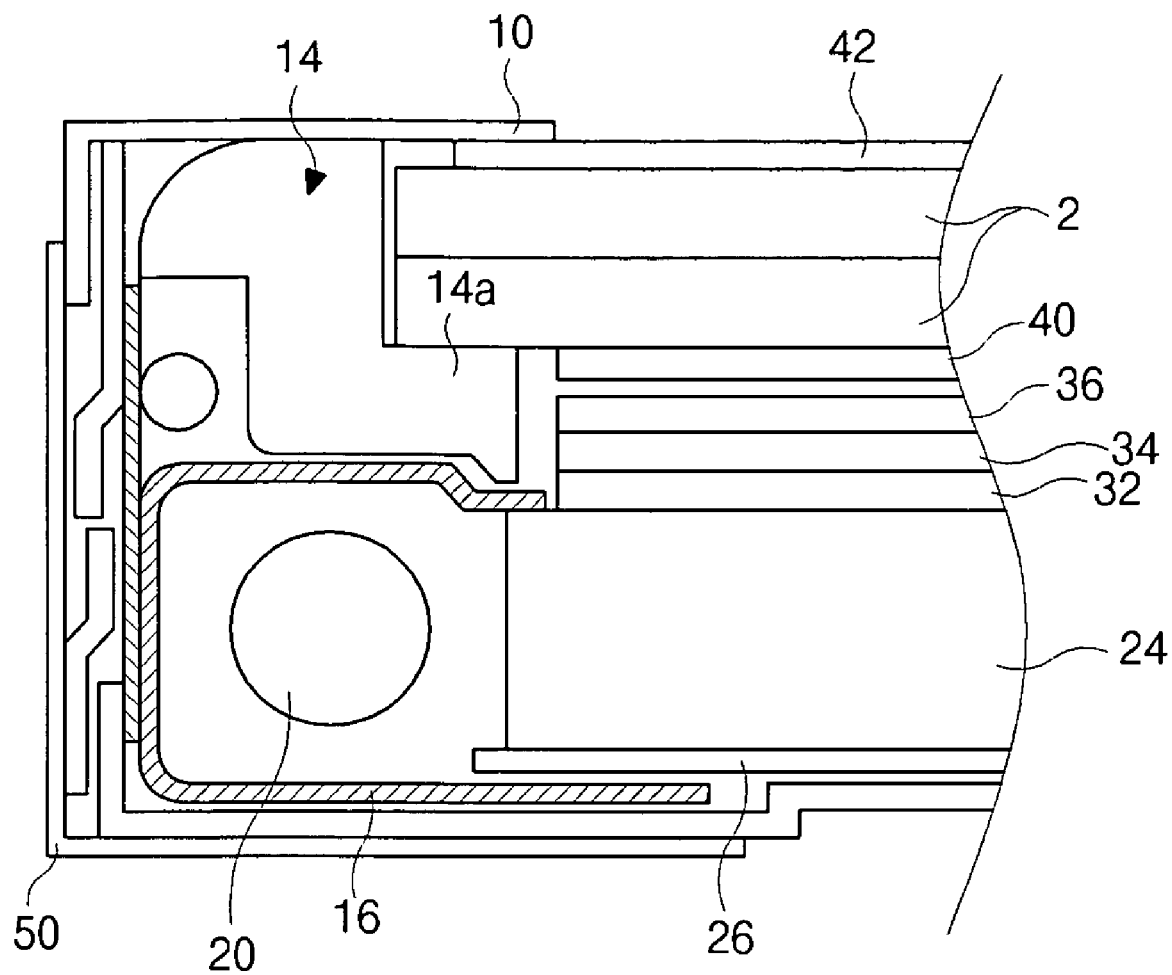
FIG. 1 is a schematic cross-sectional view of a liquid crystal display module according to the related art.
Figure 2:
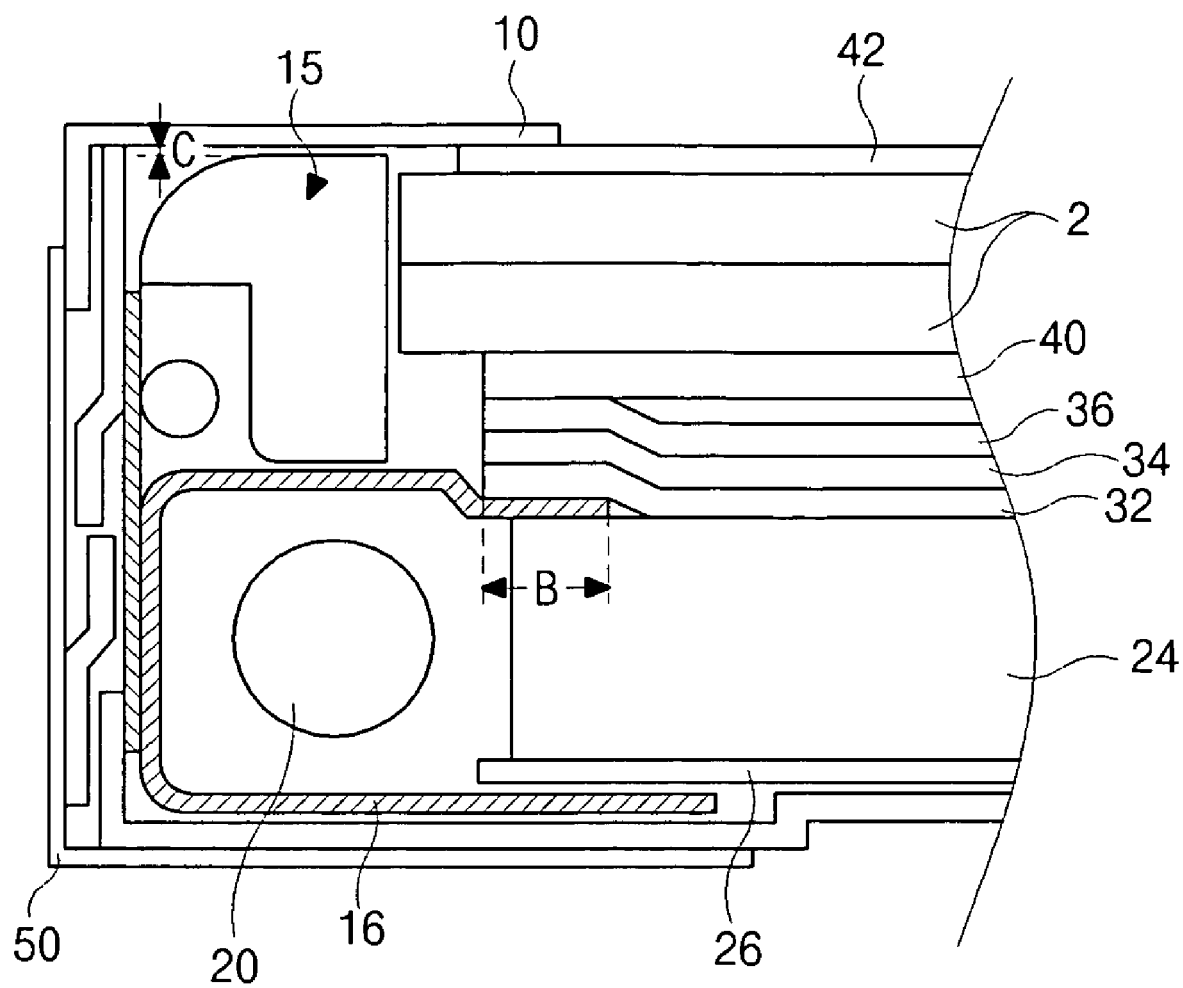
FIG. 2 is a schematic cross-sectional view of an exemplary liquid crystal display module according to the present invention.

FIG. 2 is a schematic cross-sectional view of an exemplary liquid crystal display module according to the present invention. In FIG. 2, a liquid crystal display module (LCM) may include a liquid crystal panel 2, a main support 15, a top case 10, a bottom case 50, and a backlight unit. The liquid crystal panel 2 may include a lower substrate, an upper substrate, and a liquid crystal layer (not shown) interposed therebetween. The main support 15 may accommodate and support the liquid crystal panel 2. On outer surfaces of the liquid crystal panel 2, an upper polarizer 42 may be provided to attach onto a top of the liquid crystal panel 2 and a lower polarizer 40 may be provided to attach onto the bottom of the liquid crystal panel 2. Although not shown, a plurality of pixels may be disposed in the liquid crystal panel 2 having a matrix configuration, wherein each pixel may include a thin film transistor (TFT) to drive the liquid crystal molecules.

In FIG. 2, the top case 10 may surround the edges of the liquid crystal panel 2 and the main support 15 therein. However, the top case 10 may be spaced apart from the main support 15 by a gap C, and may directly contact the upper polarizer 42 of the liquid crystal panel 2 in order to firmly secure the liquid crystal panel 2 in place. The top case 10 may have an L-shaped cross section, and may cover the side and the top portions of the main support 15. Although not shown, the top case 10 may be coupled with the main support 15 by a plurality of fasteners. In addition, the bottom case 50 may be coupled with the top case 10 to support and accommodate the backlight unit.

The backlight unit may be disposed underneath the main support 15 and the liquid crystal panel 2. The backlight unit may include a lamp 20, a lamp housing 16, a light guide plate 24, a reflector 26, and a plurality of optical sheets 32, 34, and 36. The lamp 20 emits light, and a lamp housing 16 may accommodate the lamp 20. The light guide plate 24 may direct the incident light toward the liquid crystal panel 2, and a reflector 26 disposed underneath the light guide plate 24 may reflect the light toward the liquid crystal panel 2.

A light diffusing sheet 32, a first prism sheet 34, and a second prism sheet 36 may be disposed in series between the light guide plate 24 and the liquid crystal panel 2. However, the edge portions of the optical sheets 32, 34, and 36 may be positioned a space away from the light guide plate 24. The top portion of the lamp housing 16 fitted with the light guide plate 24 may extend over an edge of the light guide plate 24 and may create a space B between the light guide plate 24 and the light diffusing sheet 32. Furthermore, instead of contacting the light guide plate 24, the peripheral portions of the optical sheets 32, 34, and 36 may contact the lower polarizer 40 without a gap enabled by a space B. Accordingly, although the lamp 20 emits heat that may possibly induce wrinkles in the optical sheets 32, 34, and 36, because the adhesion between the lower polarizer 40 and the optical sheets 32, 34, and 36 is strong, a wrinkle phenomenon may be prevented.

In FIG. 2, the main support 15 may not have any protrusions to underpin the liquid crystal panel 2. Accordingly, the liquid crystal panel 2 may slightly press the peripheries of optical sheets 32, 34, and 36, thereby preventing the formation of wrinkles in the optical sheets. In addition, since the top case 10 may be spaced apart form the main frame 15 and may directly contact the upper polarizer 42 of the liquid crystal panel 2, the optical sheets 32, 34, and 36 may receive an increased amount of pressure, thereby further reducing the wrinkle phenomenon. Moreover, the top portion of the lamp housing 16 may be extended in order to increase the space/adhesion area B without interrupting the optical display properties of the LCM.

The exemplary embodiments of the present invention provide the following advantages. Since the top portion of the lamp housing 16 is interposed as a space B between the light guide plate 24 and the diffusion sheet 32, and the peripheries of the optical sheets 32, 34, and 36 may be raised by the amount of the space B to position the edge of the second prism sheet 36 directly contacting the lower polarizer 40 of the liquid crystal panel 2, the formation of wrinkles may be prevented. In addition, the thermal reformation does not occur within the optical sheets. Moreover, since the top case 10 directly contacts the upper polarizer of the liquid crystal panel 2, the liquid crystal panel 2 may be secured in place. Therefore, the liquid crystal display module can operate under stable conditions without formation of the wrinkles.

It will be apparent to those skilled in the art that various modifications and variations can be made in the liquid crystal display module of the present invention without departing from the spirit or scope of the invention. Thus, it is intended that the present invention covers the modifications and variations of this invention provided they come within the scope of the appended claims and their equivalents.

What is claimed is:

1. A liquid crystal display module, comprising:
   a backlight assembly including:
   a lamp,
   a lamp housing surrounding the lamp and having an open portion along a first side,
   a light guide plate disposed adjacent to the open portion of the lamp housing, and
   a plurality of optical sheets disposed on the light guide plate, edge portions of all of the plurality of optical sheets are disposed spaced apart from the light guide plate by interposing a top portion of the lamp housing between a periphery of the light guide plate and a bottom surface of the edge portions of all of the plurality of optical sheets;
   a liquid crystal panel disposed over the plurality of optical sheets, wherein the plurality of optical sheets provided extending outwardly beyond a light incident face of the light guide plate;
   a main support disposed over the lamp housing and accommodating the liquid crystal panel;
   a top case surrounding edge portions of the liquid crystal panel; and
   a bottom case supporting and accommodating the backlight assembly,
   wherein the liquid crystal panel includes lower and upper polarizers on its outer surface, and a top surface of the edge portions of the plurality of optical sheets contacts the lower polarizer.

* * * * *